J. ROBERTSON.
EXTRACTING OIL FROM SEEDS.
No. 61,463. Patented Jan. 22, 1867.
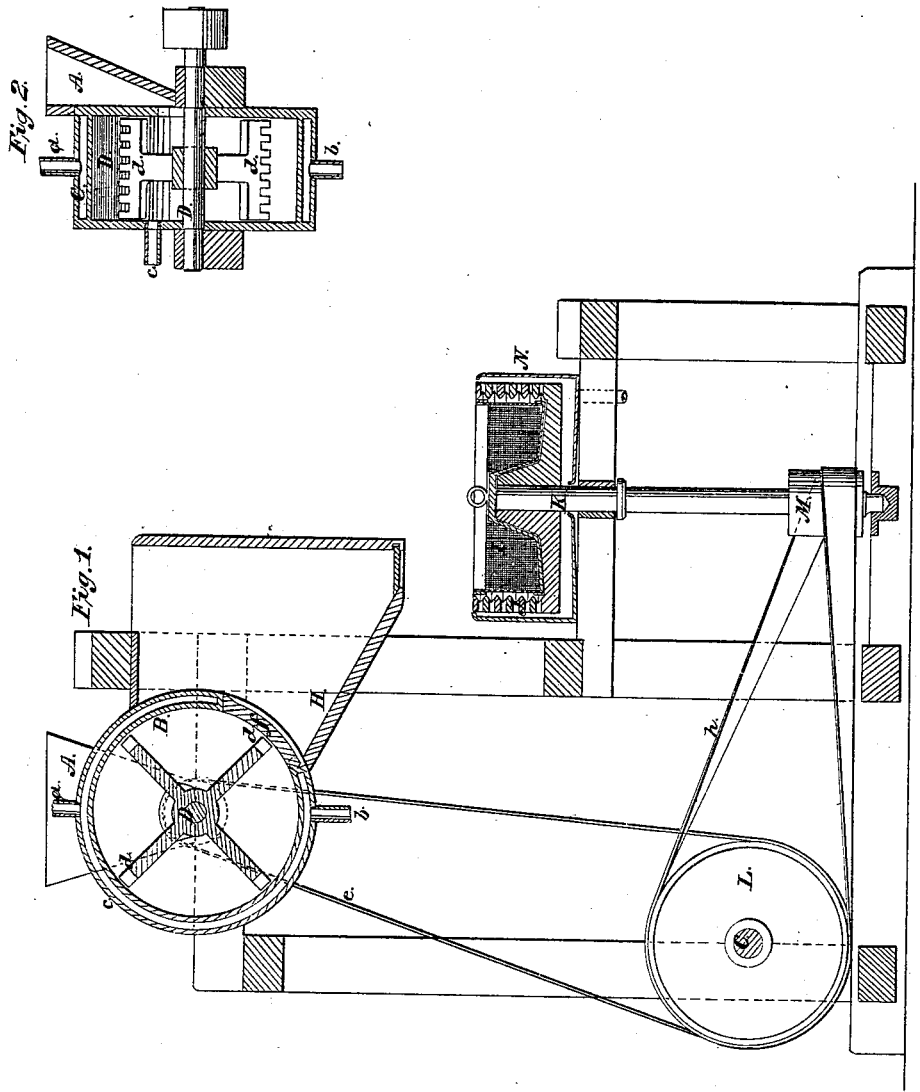
Attest:
Inventor:
John Robertson

United States Patent Office.

JOHN ROBERTSON, OF BROOKLYN, NEW YORK, ASSIGNOR TO HIMSELF AND ABRAHAM BARTHOLF.

*Letters Patent No. 61,463, dated January 22, 1867.*

---

IMPROVEMENT IN EXTRACTING OIL FROM SEEDS.

---

*The Schedule referred to in these Letters Patent and making part of the same.*

---

TO ALL WHOM IT MAY CONCERN:

Be it known that I, JOHN ROBERTSON, of Brooklyn, in the county of Kings, and State of New York, have invented a certain new and useful Improvement on Extracting Oil from Seeds and other substances, of which the following is a full, clear, and exact description, reference being had to the accompanying drawing, forming part of this specification, and in which—

Figure 1 represents a vertical sectional view of an apparatus in illustration of my improvement; and Figure 2 a vertical section, at right angles to fig. 1, of the pulverizing and pulping cylinder, with its beaters and other pertaining devices forming part of said apparatus.

Like letters indicate like parts throughout the several figures.

The nature of my invention consists in a novel process of extracting oil from linseed, or other seeds and substances, by, instead of the usual mode of grinding and mulling, or pounding and afterwards extracting the oil by pressure, first pulverizing and forming into pulp the seeds or other material, (which may be previously bruised, or have their husks or outer coverings cracked,) by subjecting, say, the seeds to the action of revolving beaters, in a close cylinder preferably heated externally, and into which steam is admitted to temper the mass, and afterwards the latter, when reduced to a pulp as described, transferred to a centrifugal machine, the action of which serves to expel or throw out the oil into a surrounding cylinder or vessel, from which the same may be run off for after treatment or use. By this my improvement, the packing of the seeds in expensive horse-hair bags, as heretofore adapted for the expulsion of the oil by the action of a press, which entails so much trouble and labor, is avoided, and oil may be extracted from a large quantity of material with or by comparatively little power.

Referring to the accompanying drawing, A represents a hopper, into which the seed, that may be first crushed between rollers, is fed and passed into a cylinder, B, heated externally by a steam jacket, C, to which $a$ $b$ are steam inlet and outlet or exhaust-water pipes; or said jacket may be otherwise heated, or in some cases not at all, or be dispensed with. Steam is also admitted to the interior of said cylinder by a pipe, $c$, to temper the mass. In this cylinder, B, are arranged a series of beaters, $d$, made to revolve by their connection with a shaft, D, driven, it may be, by a belt, $e$, and pulleys, from a main or counter-shaft, G. The seeds thus acted upon by the beaters $d$, are in due course of time not only pulverized, but reduced to a pulpy mass suitable for extraction of the oil, which, instead of employing pressure to effect, I accomplish by centrifugal action by transferring the mass, say by opening a lid, $f$, to the cylinder B, that communicates through a conductor, H, with a reticulated cylinder or screen, I, of a centrifugal machine. This screen may be lined with a felt bag, attached by hooks or otherwise, for the purpose of removing and cleaning it; said screen also should be so snugly fitted in or geared with its perforated cylinder or holder, J, as, while rotating with the latter or giving motion to its shaft, K, say through its belt, $h$, and pulleys L M, it may from time to time be readily removed therefrom to empty refuse matter or material after the oil has been extracted, and, to save time, another screen substituted. By the centrifugal action on the pulpy mass contained in the screen I, the oil is expelled or thrown into a surrounding cylinder or case, N, from which it may be run off for any desired after treament or use, as previously specified.

What I claim as my invention, and desire to secure by Letters Patent, is—

1. The process, substantially as herein described, of treating seeds or other substances for the extraction of oil, by subjecting the same to the action of beaters in a heated cylinder or case, essentially as herein set forth.

2. The within-described process of extracting the oil from seeds or other substances, reduced to a pulp by exposing the same to the action of a centrifugal machine, substantially as specified 3. The combination, with a centrifugal machine, of revolving beaters, working in a cylinder or case, as described, and to which steam is or may be admitted for separate but joint action on the material from which the oil is to be extracted, essentially as specified.

4. The arrangement, in a loose or detachable manner, within the revolving cylinder or holder of a centrifugal machine, and so as to rotate with said holder, of the reticulated cylinder or screen in which the material is placed for action, as described.

JOHN ROBERTSON.

Witnesses:
J. W. COOMBS,
G. W. REED.